United States Patent [19]
Loh et al.

[11] Patent Number: 5,621,805
[45] Date of Patent: Apr. 15, 1997

[54] APPARATUS FOR SAMPLE RATE CONVERSION

[75] Inventors: Ngiang G. Loh; Jesper B. Henriksen, both of Singapore, Singapore

[73] Assignee: Aztech Systems Ltd., Singapore, Singapore

[21] Appl. No.: 255,258

[22] Filed: Jun. 7, 1994

[51] Int. Cl.$^6$ ............................ G11B 27/031; G10L 3/02; G10F 1/08
[52] U.S. Cl. ............................ 381/119; 84/625; 84/660
[58] Field of Search ................................ 375/349, 350, 375/347, 201, 202; 381/119, 61, 63; 455/139, 303, 306, 315, 326; 84/660, 625; 327/355, 361, 113; 348/584, 598

[56] References Cited

U.S. PATENT DOCUMENTS

| | | | |
|---|---|---|---|
| 5,159,453 | 10/1992 | Dhein et al. | 358/142 |
| 5,231,240 | 7/1993 | Lu | 84/660 |
| 5,392,284 | 2/1995 | Sugiyama | 370/84 |
| 5,402,499 | 3/1995 | Robison et al. | 381/119 |

*Primary Examiner*—Wellington Chin
*Assistant Examiner*—Jean B. Corrielus
*Attorney, Agent, or Firm*—Blakely, Sokoloff, Taylor & Zafman LLP

[57] ABSTRACT

An apparatus and method for digital mixing and sample rate conversion in a computer system is disclosed. The fully digital mixer of the present invention comprises: 1) a digital input receiver for receiving a plurality of digital data input signals and a corresponding plurality of input clock signals. The digital input receiver also receives an output clock signal. The digital input receiver further includes a data rate converter for converting the plurality of digital data input signals to a sampling rate corresponding to the output clock signal. The data rate converter produces a plurality of converted digital data output signals; 2) a digital filter unit coupled to the digital input receiver. The digital filter unit includes a plurality of digital filters for filtering the plurality of converted digital data output signals to produce a plurality of filtered digital data output signals; and 3) a digital blending unit coupled to the digital filter unit. The digital blending unit includes logic for combining the plurality of filtered digital data output signals to produce a mixed digital output signal.

8 Claims, 9 Drawing Sheets

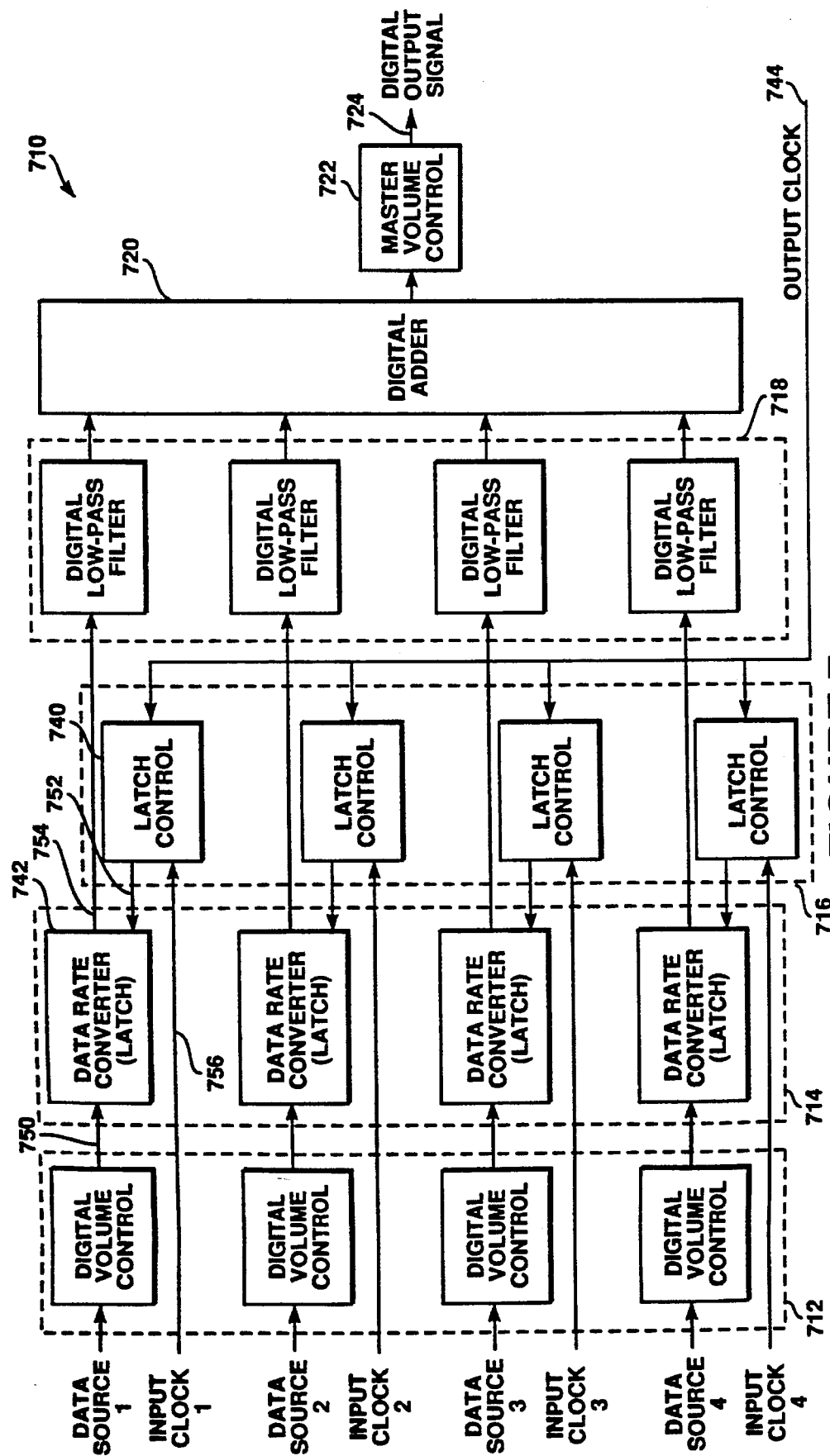

APPARATUS FOR SAMPLE RATE CONVERSION

BACKGROUND OF THE INVENTION

1. Field of the Invention

The field of the present invention relates to sampling signals, such as audio signals, and mixing together these signals as they are provided by various input sources. Specifically, the present invention relates to signal mixing and converting input signals from one time domain to another.

2. Description of Related Art

Modern computer systems, especially personal computers (PCs), are more commonly being used for signal processing. Signal processing comes into play in multimedia applications of a computer system. Multimedia applications typically include means for processing audio signals, video or image signals, analog signals, or other forms of information carrying signals. Conventional techniques are well known for processing analog signals using sampling. Sampling is the act of measuring a signal at certain time intervals. In some personal computer (PC) multimedia systems, these signal samples are converted to a digital form and further processed as digital signals.

A typical multimedia computer system supports signal inputs from a plurality of sources. These multiple source inputs are typically combined into a single or fewer number of signal outputs using a signal mixer. In general, two types of signal mixers exist in the prior art: 1) analog mixers, and 2) digital mixers. Both analog and digital mixers perform mixing using summation. All input signals are added and the resulting output signal is the sum of all inputs. The vast majority of conventional PC multimedia computer systems use analog mixing for combining signals from multiple sources. Digital mixing, however, has several advantages over analog mixing. In a typical PC multimedia environment, most signals, such as audio signals, are already in a digital form. For example, high quality 16-bit audio signals may be provided by a CD ROM player or as 8-bit sampled sound effects from computer entertainment software packages. Using a digital mixer, there is no need for additional circuitry to convert the digital signals to an analog form. Another advantage of digital mixing is the production of better quality digital signals. Electrical component tolerances have little or no effect in digital circuits, whereas analog signals are usually susceptible to component tolerances. In addition, digital signals are much more tolerant to electrical noise. This advantage of digital mixers is of significant importance in a PC environment where high speed digital switching can easily interfere with analog circuits. Yet another advantage of digital mixing is that digital circuits can be implemented more easily using ASIC technology. These implementations reduce the size, chip count, and power consumption of the signal mixing circuitry.

In spite of the advantages of using digital mixers in multimedia computer systems, several problems have been encountered in prior art systems using multiple digital signals and digital mixers. First, conventional systems require that digital input signals and the output signal generated by the digital mixer must be of the same sampling rate. This limitation is significant in multimedia systems where various signals may originate from sources having an arbitrary sampling rate. Secondly, converting from one sampling rate to a different sampling rate can generate aliasing. Aliasing causes shadow signals to appear when the sampling frequency is less than twice the bandwidth of the input signal. Thirdly, the ratio between the maximum output signal level and the present signal level (headroom) is limited in digital signals. For example, summing two 16-bit digital signals will result in a 17-bit signal. Thus, the input signals must be limited or output data will be lost. Finally, the Signal to Noise Ratio (SNR) deteriorates by 6 dB every time the input signal level is reduced by half. Thus, it is important to select the correct number of bits for representing the digital signal given the anticipated dynamic range of the input signals.

Thus, a better digital mixer for combining digital input signals and performing sample rate conversion is needed.

SUMMARY OF THE INVENTION

The present invention is an apparatus and method for digital mixing and sample rate conversion in a computer system. The fully digital mixer of the present invention comprises: 1) a digital input receiver for receiving a plurality of digital data input signals and a corresponding plurality of input clock signals. The digital input receiver also receives an output clock signal. The digital input receiver further includes a data rate converter for converting the plurality of digital data input signals to a sampling rate corresponding to the output clock signal. The data rate converter produces a plurality of converted digital data output signals; 2) a digital filter unit coupled to the digital input receiver. The digital filter unit includes a plurality of digital filters for filtering the plurality of converted digital data output signals to produce a plurality of filtered digital data output signals; and 3) a digital blending unit coupled to the digital filter unit. The digital blending unit includes logic for combining the plurality of filtered digital data output signals to produce a mixed digital output signal.

Thus, it is an object of the present invention to provide an apparatus and method for digital mixing and sample rate conversion wherein the digital mixing and sample rate conversion is fully digital. It is a further object of the present invention to provide a digital mixing and data rate conversion apparatus that is easily implemented in an application specific integrated circuit (ASIC). It is a further object of the present invention to provide a simple data rate converter wherein the input data is combined with an output data rate clock in a latch to produce an output data signal every time the output clock goes active.

These and other advantages of the present invention are fully described in the following detailed description of the preferred embodiment.

BRIEF DESCRIPTION OF THE DRAWINGS

FIG. 7 illustrates the architecture of the digital mixing and data rate conversion apparatus of the preferred embodiment.

DETAILED DESCRIPTION OF THE PREFERRED EMBODIMENT

The present invention is an apparatus and method for digital mixing and sample rate conversion in a computer system. In the following detailed description, numerous specific details are set forth in order to provide a thorough understanding of the present invention. However, it will be apparent to one of ordinary skill in the art that these specific details need not be used to practice the present invention. In other instances, well known structures, interfaces and processes have not been shown in detail in order not to unnecessarily obscure the present invention.

Analog signals can be sampled and converted to a digital form using well known techniques. Analog signals are sampled by measuring the analog signal at a certain time interval called the sampling period. The sampling frequency is the reciprocal of the sampling period. The samples are converted to a digital form by encoding the sampling information into a number of binary bits. If n bits are used, $2^n$ binary values can be used to represent the analog signal sample. It also follows that the smallest signal that may be represented by n bits is $\frac{1}{2^n}$ of a full scale signal. Any signal smaller than this minimum value cannot be represented. This inaccuracy in converting an analog sample to a digital representation gives rise to noise during reproduction of the digital signal. Techniques are well known to those of ordinary skill in the art for computing a signal to noise ratio (SNR) which represents the quality of the digitized signal.

Referring now to FIG. 1, a band limited signal is sampled 110 at a predetermined frequency $f_s$. When the signal sampled at frequency $f_s$ is later reproduced, the resulting signal reappears at integer multiples of the sampling frequency $f_s$ (i.e., $2*f_s$, $3*f_s$, ...) as illustrated in FIG. 1B. These resulting signals that reappear at integer multiples of the sampling frequency can be denoted shadow signals.

Figure 1A:
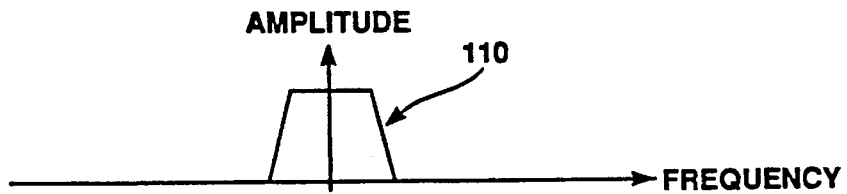
FIGS. 1A–1D illustrate the prior art method of sampling an analog signal.
Figure 1B:
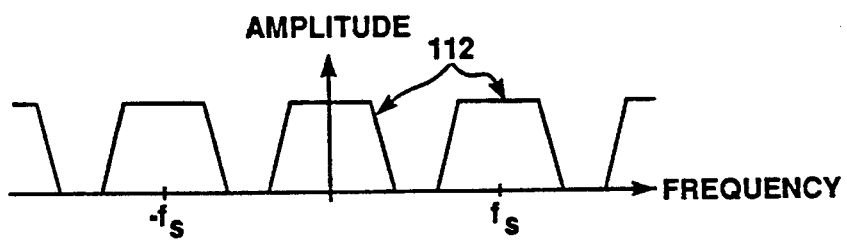
Figure 1C:
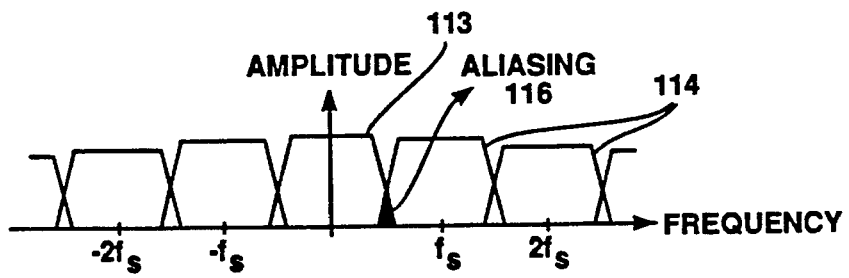

Referring now to FIG. 1C, a well known problem of aliasing is illustrated. If the sampling frequency $f_s$ is less than twice the bandwidth of the sampled signal, the sampled signal 113 and the first of the shadow signals 114 will overlap thereby producing an aliasing region 116 as shown in FIG. 1C.

Figure 1D:
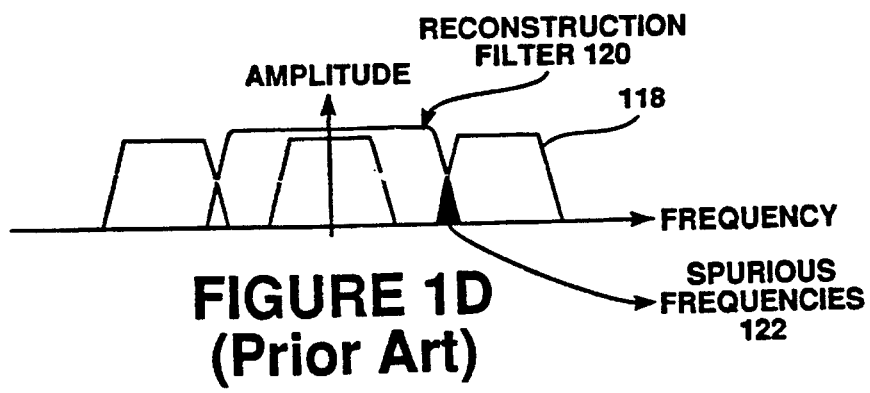

FIG. 1D illustrates the use of a reconstruction filter 120. In order to avoid spurious signals, it is important to perform filtering of a regenerated output signal using a reconstruction filter 120. If the sampling frequency $f_s$ is much higher than the bandwidth of the input signal, a low order filter can be used. If the sampling frequency $f_s$ is approximately double the bandwidth of the input signal, a high order filter is necessary. These techniques for sampling an input analog signal and converting an analog signal to a digital form are well known to those of ordinary skill in the art.

Figure 2:
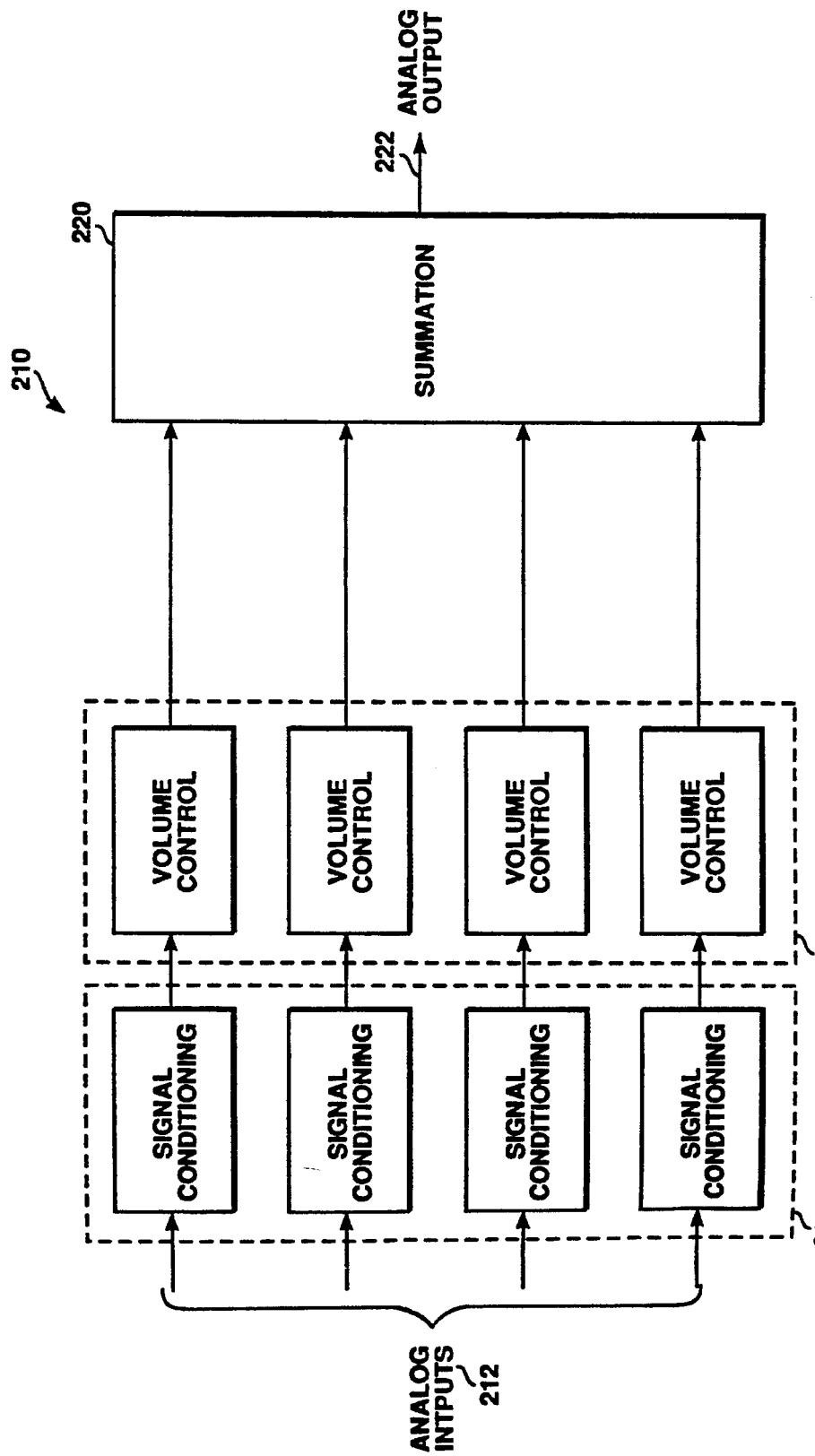
FIG. 2 illustrates a prior art analog mixer.

Signal mixing is required when a plurality of input signals must be combined to form a fewer number of output signals or a single output signal. Two types of mixing can be used: analog mixing and digital mixing. FIG. 2 illustrates the architecture of a conventional analog mixer. As shown in FIG. 2, a plurality of analog inputs 212 are provided to a signal conditioning unit 214 where the analog input signals 212 are filtered and conditioned. Signal conditioning unit 214 may include filters, level and impedance matching, balanced to unbalanced converters as well as pre-amplifiers. The conditioned signals are then fed to a volume control unit 216 where the amplitude of each analog input signal is selectively adjusted depending on a volume control selection. The volume adjusted signals are then fed to summation unit 220. In the prior art analog mixers, summation unit 220 simply added up the plurality of analog input signals to produce a summation analog output signal 222. The analog mixer such as the one illustrated in FIG. 2 is well know to those of ordinary skill in the art.

Although analog mixers can combine a plurality of analog inputs to produce an analog output, the manipulation of analog signals in a digital computer can be difficult. Moreover, sometimes the input signals are already available in a digital form. Thus, digital mixers provide a second means for combining a plurality of input signals to produce a single output signal. Although both analog and digital mixers use summation to combine a plurality of input signals to produce a fewer number or a single output signal, digital mixers provide several advantages over analog mixers in a digital computer environment. First, in a typical personal computer multimedia environment, most input signals are already provided in a digital form. Thus, these input signals can be directly coupled to a digital mixer with no conversion required. Secondly, digital signals are much more tolerant to electrical noise. Thirdly, digital mixer components do not require the high tolerances that are required using analog components. Finally, digital circuits can be implemented more easily using ASIC technology than is possible using analog circuits. Thus, it is increasingly more important to provide an improved means for digital sampling and for mixing a plurality of digital inputs to produce a mixed digital output signal.

Several problems exist in implementing a digital mixer. First, it cannot be guaranteed that the plurality of input digital signals provided to a digital mixer are all sampled at the same sampling frequency. Secondly, converting an input digital signal from one sampling rate to another sampling rate may generate aliasing. Thirdly, the number of binary bits available for encoding a digitized signal affects the signal to noise ratio and the dynamic range between the signal being digitized and the maximum value that can be represented by the number of available bits (dynamic headroom).

Figure 3A:
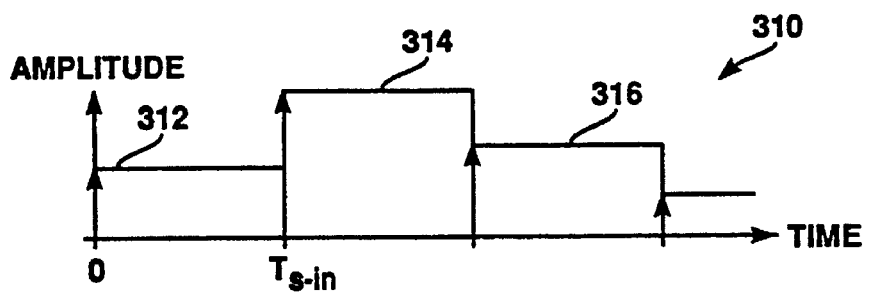
FIGS. 3A–3C illustrate the digital sampling technique used in the present invention.
Figure 3B:
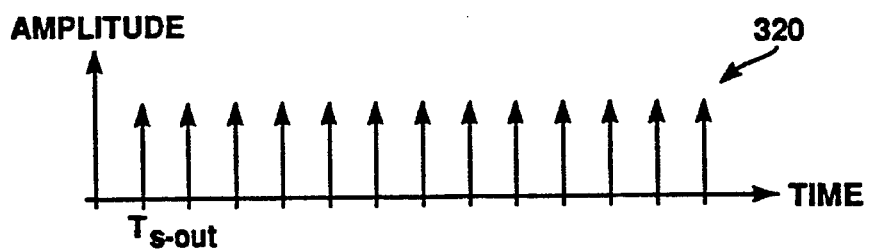
Figure 3C:
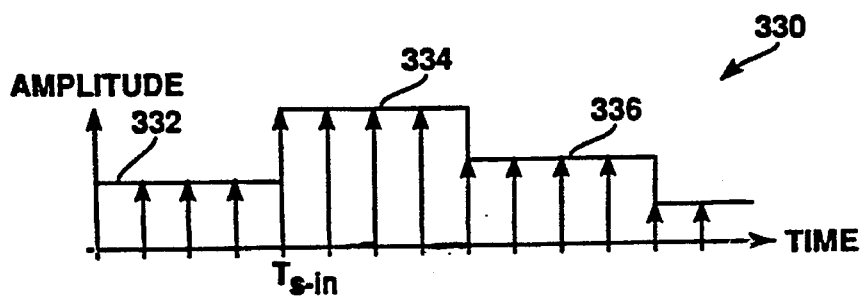

Referring to FIGS. 3A, 3B, and 3C, the digital data rate or sample rate conversion technique used by the present invention is illustrated. In a typical digital mixer, the digital mixer may receive a plurality of digital input signals all sampled at arbitrary rates. For example, a digital mixer may receive audio signals from a compact disc (CD) sampled at a 44.1 kHz, audio signals from a digital audio tape (DAT) sampled at a 48 kHz rate or digital signals created by sound management software at a 22.05 kHz rate or digital signals from other sources at differing sampling rates. The various input sampling rates create the need for sample rate conversion to produce an output digital signal at a unified sampling rate. The present invention provides a solution to the digital data rate conversion problem and provides a means and method for combining digital audio signals over a wide range of ratios between input and output clocks of the data rate converter.

FIG. 3A illustrates a signal sampled at a first sample rate $T_s$-in. Each sample 312, 314, and 316 of signal 310 is taken at an interval corresponding to the sampling rate $T_{s\text{-}in}$. In most situations in a digital mixer, it will be necessary to convert signal 310 from an input sampling rate to an output sampling rate. The output sampling clock 320 is illustrated in FIG. 3B. The desired output sampling rate is denoted $T_{s-out}$. Using the output sampling rate clock 320, the input signal 310 is sampled at a rate determined by the output clock 320 to produce an output signal 330 which has been converted to a sampling rate corresponding to the output sampling rate clock 320. The apparatus and method for achieving this sample rate conversion is described in detail below.

Figure 4:
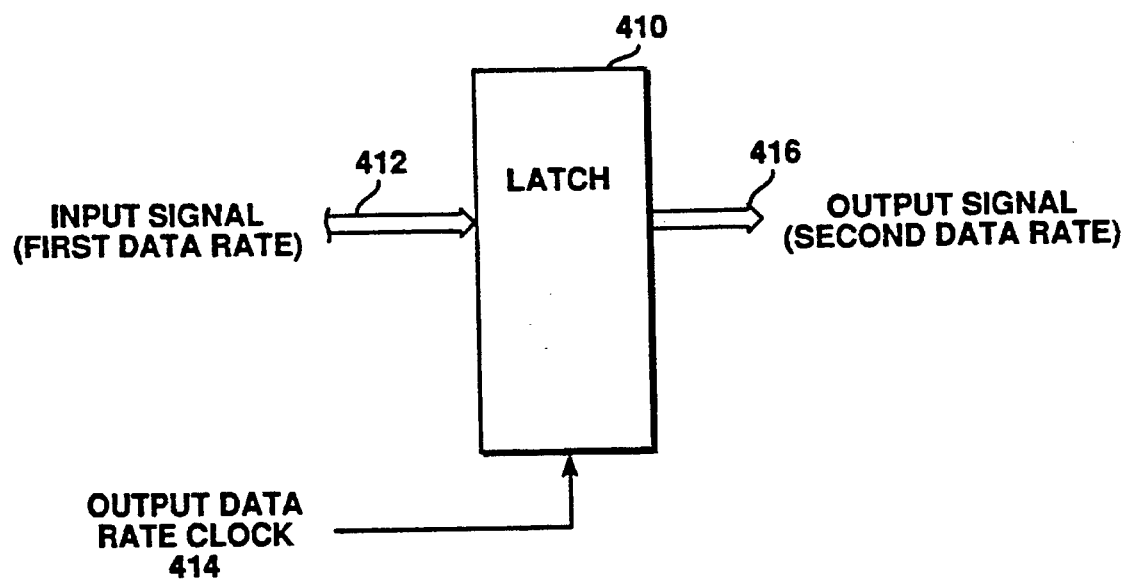
FIG. 4 illustrates the data rate converter used in the present invention.

Referring now to FIG. 4, the data rate converter of the present invention is illustrated. An input signal 412 at a first data rate is coupled to an input of latch 410. The output data rate clock signal 414 is coupled to the clock input of latch 410. Input signal 412 of FIG. 4 corresponds to input signal 310 of FIG. 3A described above. Output data rate clock 414 of FIG. 4 corresponds to output sampling rate clock 320 illustrated in FIG. 3B. The input signal 412 is transferred to an output buffer and provided as output signal 416 every time the output clock tick of output data rate clock 414 transitions. Thus, output signal 416 is produced at a second data rate corresponding to the output data rate clock 414 as illustrated as output signal 330 shown in FIG. 3C. Thus, the data rate converter of the present invention may be implemented as a latch coupled in the manner shown in FIG. 4. One such latch available for this purpose is part number SN74LS373—Octal D-Type latch available from Texas Instruments Corporation. To avoid glitches when the audio data is transferred to the output buffer in latch 410, decoder logic (not shown) ensures that the input signal is not latched when the input signal is in transition.

Figure 5:
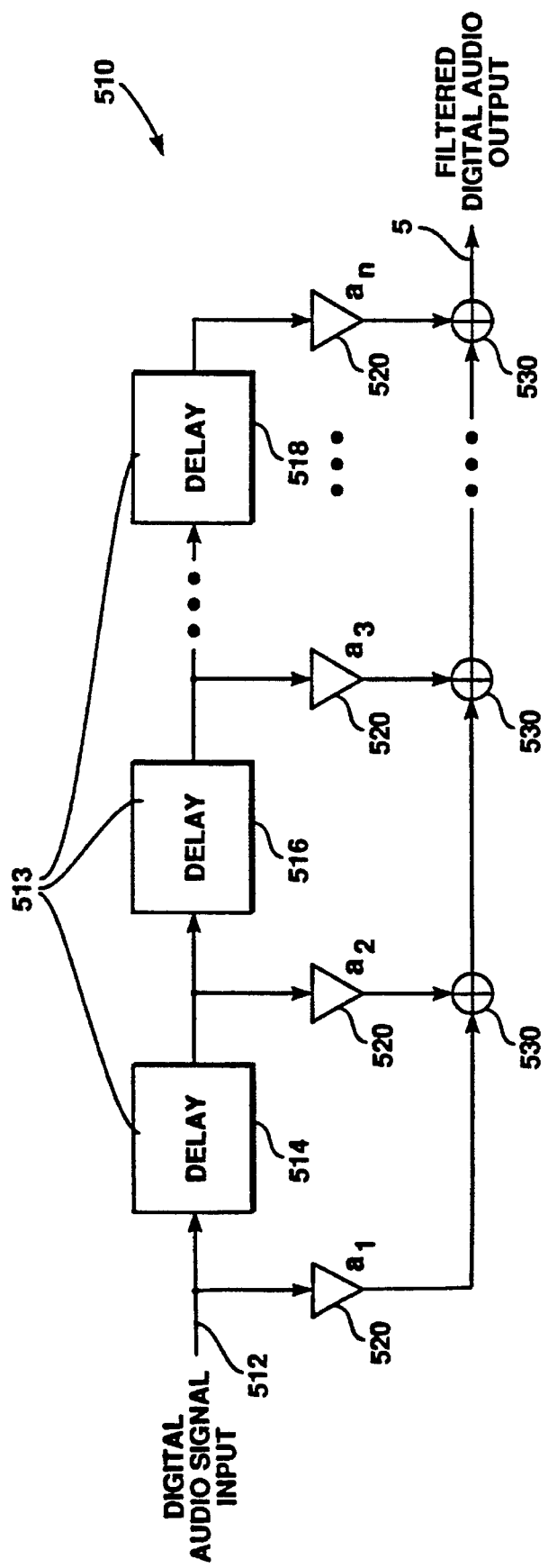
FIG. 5 illustrates an example of a digital filter used in the present invention.

The sample rate conversion technique of the present invention, in a manner similar to the sampling of an analog signal, can generate aliasing. This aliasing however is removed using a digital filter. Any conventional type of digital filter can be used. In the preferred embodiment, a finite-duration impulse response (FIR) filter is used due to the lack of feedback and the ability to handle a large range of input data rates. A conventional FIR filter is shown in FIG. 5. The number of taps, n, and their values an, determine the order and cut off frequency of the filter. In an alternative embodiment, an infinite-duration impulse response (IIR) filter is used as a digital filter. An FIR filter such as the one shown in FIG. 5 and IIR filters are well known to those of ordinary skill in the art.

Figure 6A:
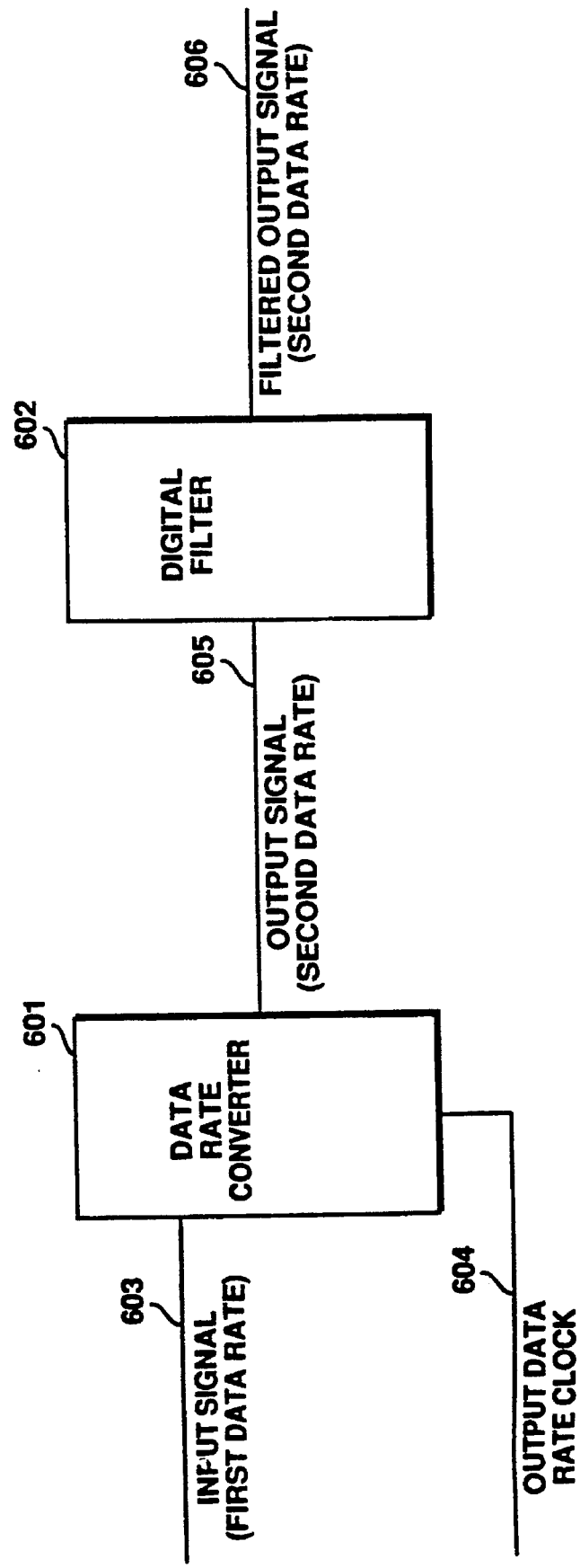
FIGS. 6A–6B and 6C illustrate the process of converting a digital audio signal.
Figure 6B:
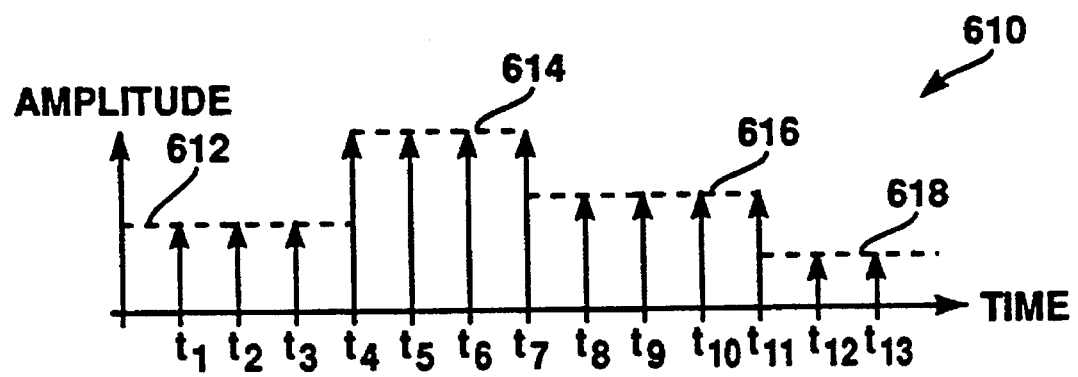
Figure 6C:
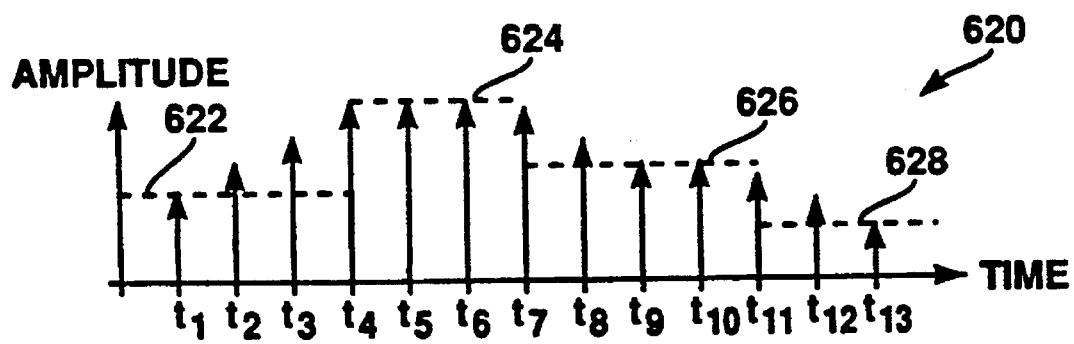

Referring now to FIG. 6A, the apparatus of the present invention for performing data rate conversion and signal filtering is illustrated. Data rate converter 601 receives an input signal 603 at a first data rate. Data rate converter 601 also receives output data rate clock 604. As described above in connection with FIG. 4, data rate converter 601 produces output signal 605 at a second data rate corresponding to the output data rate clock 604. Output signal 605 is provided as an input to digital filter 602. As described above, digital filter 602 is implemented in the preferred embodiment as an FIR filter. In an alternative embodiment, digital filter 602 is implemented as an infinite-duration (IIR) filter. Digital filter 602 receives output signal 605 from data rate converter 601 and produces a filtered output signal 606 at the same second data rate provided by data rate converter 601. FIG. 6B illustrates an example of a data rate converted signal 610 corresponding to output signal 605 produced by data rate converter 601. FIG. 6C illustrates a filtered output signal 620 such as the filtered output signal 606 produced by digital filter 602.

Referring to FIG. 7, a block diagram of the fully digital mixer 710 of the present invention is illustrated. Digital mixer 710 comprises means for receiving input signals on a plurality of input channels. Each channel comprises 1) a data source which carries an input digital data signal, and 2) an input clock source corresponding to the sampling clock used for sampling the data source on the corresponding channel. As shown in FIG. 7, the digital mixer 710 includes four digital channel inputs each comprising a data source and a corresponding input clock. It will be apparent to one of ordinary skill in the art that a greater or lesser number of channels may be supported in an equivalent digital mixer. The input channels are coupled to a digital input receiver comprising digital volume control unit 712, data rate converter unit 714, and latch control unit 716. Digital volume control unit 712 comprises a plurality of individual volume controls for individually adjusting the volume on each channel. In the present invention, the volume of the input digital data signal is adjusted by scaling the input signal. The volume adjusted digital signals for each channel are output from the digital volume control unit 712 and provided as input to a data rate converter unit 714. In an alternative embodiment, the digital mixer of the present invention can be implemented without a volume control unit.

Data rate converter unit 714 comprises a data rate converter for each channel of digital mixer 710. The input digital signal for each data rate converter is provided by the digital volume control component on the corresponding channel. Each data rate converter of data rate converter unit 714 comprises an apparatus corresponding to the data rate converter illustrated in FIG. 4 and described above. Because the input digital data on each channel may be sampled at an arbitrary rate, data rate converter unit 714 provides a means for converting incompatible or differently sampled input digital signals to a common sampling rate for output by digital mixer 710.

Data rate converter unit 714 operates in cooperation with latch control unit 716 to convert each input data signal to a common output sampling rate. Latch control unit 716 comprises a separate latch control circuit for each data source. For example, one such latch control circuit 740 is illustrated in FIG. 7. Similarly, data rate converter unit 714 comprises a separate latch circuit for each data source. For example, one such latch circuit 742 coupled to latch control circuit 740 is illustrated in FIG. 7. Latch control circuit 740 and latch circuit 742 operate cooperatively to convert data source 1 to a common output sampling rate corresponding to output clock 744. It will be apparent to one of ordinary skill in the art that each of the circuits of latch control unit 716 and data rate converter unit 714 operate in a similar manner for their corresponding data source inputs.

There are several ways to implement the circuits of latch control unit 716 and data rate converter unit 714. The basic idea is to calculate when the input signal 750, for example, is changing state. When this occurs, the output sampling clock 752 is delayed for a short period to prevent a transitional output signal from being output on line 754. Because input signal 750 changes state according to the input clock 756, for example, and because input clock 756 is periodic in nature, it is possible to calculate when input signal 750 is going to change state. The only time input clock 756 is not periodic is when the sampling rate of the input signal source is changed. In this case, however, the input signal source is muted until the input clock stabilizes at a new periodic rate.

There are several methods for detecting the occurrence of a state transition of the input signal clock 756. Two such methods are illustrated in FIGS. 8 and 9.

Figure 8:
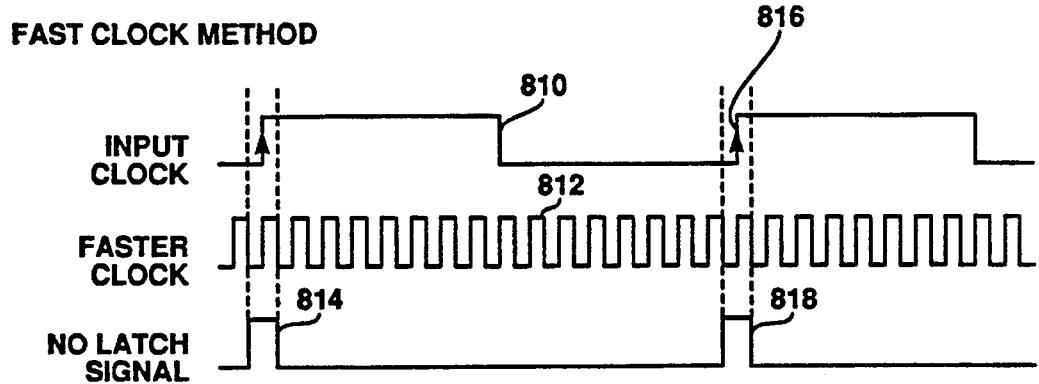
FIG. 8 illustrates a fast clock implementation of a latch control circuit.

Referring to FIG. 8, a fast clock method for detecting an input clock transition is illustrated. In this method, a fast clock signal 812 running several times faster than the input clock 810 is provided. When the input clock 816 transitions to a new state 816, a no latch signal 814 is asserted 818 for one fast clock cycle while the input clock transitions. The no latch signal 814 prevents latch 742 from outputting data on line 754 while input clock 756 is in transition.

Figure 9:
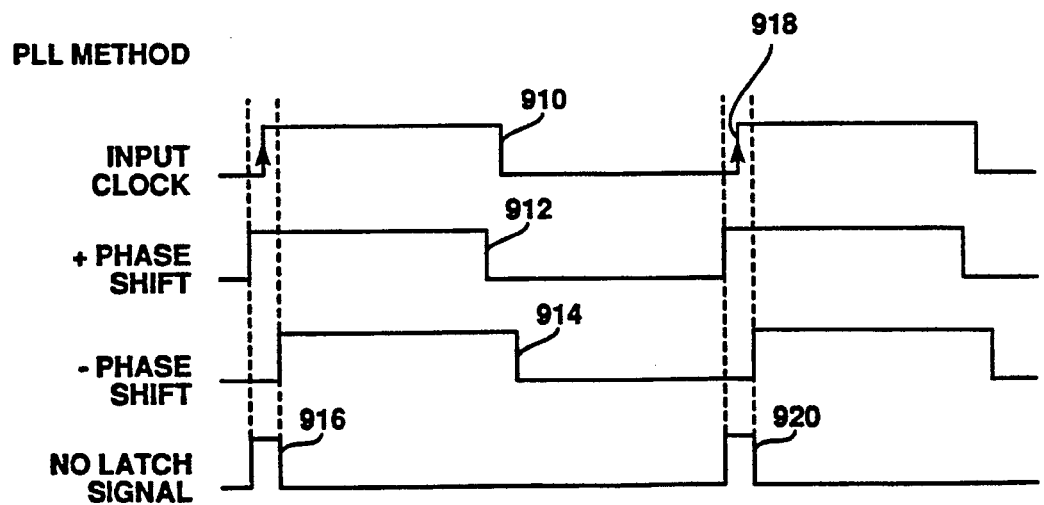
FIG. 9 illustrates a phase locked loop (PLL) implementation of a latch control circuit.

Referring to FIG. 9, a phase locked loop (PLL) method for detecting an input clock transition is illustrated. In this method, a PLL, a timer, an RC circuit, or any other circuit is used to generate a pair of clock signals 912 and 914 synchronized to the input clock signal 910, but phase shifted by a pre-determined delay time. When the input clock 910 changes state at time 918, a no latch signal 916 is asserted 920 for a time corresponding to the phase-shift delay time. In this manner, the no latch signal 916 prevents latch 742 from outputting data on line 754 while input clock 756 is in transition.

Both the fast clock method and the PLL method can be used to delay or disable the output sampling clock 752 from latching in the input signal 750. It will be apparent to one of ordinary skill in the art that these or other methods can be used for converting each input data signal provided to digital volume control unit 712 to a common output sampling rate. These converted output signals are output by data rate converter unit 714.

In an alternative embodiment, the digital mixer of the present invention can be implemented without a latch control unit 716. Note that if there is no latch control, chances are that the output clock and the transition of the input signal will hardly ever occur exactly at the same time. A transition normally takes less than 10 nanoseconds (ns) using standard TTL logic. Erroneous data caused by the lack of latch control may not be audible or visible after processing by the digital filters.

Each data rate converter of data rate converter unit 714 receives the output clock signal from latch control unit 716. Using the method described above in connection with FIGS. 4, 7, and 8, each data rate converter converts the input data signal to a sampling rate corresponding to the output clock 744. These converted signals are output on each channel from data rate converter unit 714 and received by digital filter unit 718. The converted signal for each channel is separately filtered using a digital low pass filter of digital filter unit 718. Each digital low pass filter is of a type similar to the FIR filter illustrated in FIG. 5 and described above. The filtered digital output signals are provided as input to digital blending unit, or as denoted in the preferred embodiment, digital adder 720. An example of digital adder 720 is part number 74LS283A—Four bit binary full adders with fast carry, available from Texas Instruments Corporation. In the preferred embodiment, digital adder 720 mathematically adds the values of the converted and filtered digital signal information provided on each channel and outputs a single combined digital signal to a master volume control 722. It will be apparent to one of ordinary skill in the art that the channel inputs can be blended or combined in various alternative ways. The volume of the combined output signal is selectively adjusted using master volume control 722 and the digital output signal 724 thereby produced by digital mixer 710 is output for use by other subsystems.

In the present invention, master volume control 722 carries an additional feature of adjusting the number of bits used to represent the digital data signals manipulated by digital mixer 710. In conventional analog systems, there is usually sufficient headroom, because the mixer's output amplifiers rarely work at maximum output signal levels. In order to achieve a maximum signal to noise ratio in digital systems, the full range of values provided by a number of bits for a particular system is normally used for representing the input digitized data signals. Thus, there is very little headroom provided in a digital system. This can pose a problem if a 16 bit digital to analog decoder, for example is employed. A problem is created when two 16 bit digital signals, for example, are added together and a 17th bit or a carry bit is generated.

In the present invention, a greater number of bits are used internally by digital mixer 710 to represent the digital data input signal on each channel. Each unit of digital mixer 710 (i.e., units 712, 714, 716, 718, and 720) provide an additional bit for representing digital data than is provided by the digital input signals. Once digital adder 720 combines the digital signals from each channel, the combined digital value including the additional bits is provided to master volume control 722. The digital adder 720 generates the additional bits due to summation (i.e., adding generates one or more carry bits depending on the number of inputs). Master volume control 722 truncates the least significant bits of the digital value provided by digital adder 720 to produce a digital output signal 724 represented by a number of bits equal to the number of bits representing the input data signals provided to digital mixer 710 on each input channel. Thus, the present invention maintains an acceptable dynamic headroom throughout the digital processing while minimizing the loss of information in the combined digital value. In addition, the digital mixer 710 of the present invention has the advantage that the full dynamic range of the input signals can be used. This is significant because the signal to noise ratio decreases by 6 dB every time the signal level is reduced by one bit.

Thus, an apparatus and method for digital mixing and sample rate conversion in a computer system is disclosed. The specific arrangements and methods described herein are merely illustrative of the principles of this invention. Numerous modifications in form and detail may be made by those of ordinary skill in the art without departing from the scope of the present invention. Although this invention has been shown in relation to a particular embodiment, it should not be considered so limited. Rather, the present invention is limited only by the scope of the appended claims.

We claim:

1. A fully digital mixer comprising:

a first digital input receiver for receiving a plurality of digital input signals and a corresponding plurality of input clock signals;

a second digital receiver for receiving a digital output clock signal;

a digital latch coupled to said first digital input receiver and said second digital receiver, said digital latch for storing said digital input signal and for producing a plurality of output signals that corresponds with said digital output clock signal;

a digital latch control unit coupled to said first digital input receiver and said second digital receiver, said digital latch control unit for disabling said digital output clock signal while one of said plurality of digital input signals is transitioning to a new state;

a digital filter unit coupled to said digital latch, said digital filter unit including a plurality of digital filters for filtering said plurality of output signals to produce a plurality of filtered digital output signals; and a digital blending unit coupled to said digital filter unit, said digital blending unit including logic for combining said plurality of filtered digital output signals to produce a mixed digital output signal, wherein said digital blending unit is a digital adder.

2. The fully digital mixer as claimed in claim 1, wherein said digital filter unit includes a plurality of finite-duration impulse response (FIR) filters.

3. The fully digital mixer as claimed in claim 1, wherein said digital filter unit includes a plurality of infinite-duration impulse response (IIR) filters.

4. A multimedia computer system comprising:

a processor;

a digital signal generation apparatus, coupled to said processor, said apparatus for generating a plurality of digital input signals under control of said processor;

a fully digital mixer coupled to said digital signal generation apparatus, said digital mixer including:
1) a first digital input receiver for receiving said plurality of digital input signals and a corresponding plurality of input clock signals;
2) a second digital receiver for receiving a digital output clock signal;
3) a digital latch coupled to said first digital input receiver and said second digital receiver, said digital latch for storing said digital input signal and for producing a plurality of output signals that corresponds with said digital output clock signal;
4) a digital latch control unit coupled to said first digital input receiver and said second digital receiver, said digital latch control unit for disabling said digital output clock signal while one of said plurality of digital input signals is transitioning to a new state;
5) a digital filter unit coupled to said first digital input receiver, said digital filter unit including a plurality of digital filters for filtering said plurality of output signals to produce a plurality of filtered digital output signals;
6) a digital blending unit coupled to said digital filter unit, said digital blending unit including logic for combining said plurality of filtered digital output signals to produce a mixed digital output signal, wherein said digital blending unit is a digital adder; and a signal presentation apparatus for presenting said mixed digital output signal to a user of said multimedia computer system.

5. The multimedia computer system as claimed in claim 4, wherein said first digital input receiver includes a plurality of latches, and wherein said first digital input receiver cooperates with at least one of said plurality of latches to convert said plurality of digital input signals to a sampling rate corresponding to said digital output clock signal.

6. The multimedia computer system as claimed in claim 4, further including a master volume control coupled to said digital blending unit for adjusting the volume of said mixed digital output signal.

7. The multimedia computer system as claimed in claim 4, wherein said plurality of digital input signals represent audio data.

8. The multimedia computer system as claimed in claim 4, wherein said plurality of digital input signals represent video data.

* * * * *